United States Patent [19]

Bessey et al.

[11] Patent Number: 4,677,838
[45] Date of Patent: Jul. 7, 1987

[54] INSTALLATION FOR PREPARING METAL BILLETS FOR EXTRUSION

[75] Inventors: Guy Bessey, Auvers sur Oise; Claude Bimbert, Neiully-Plaisance, both of France

[73] Assignee: CLECIM, Courbevoie, France

[21] Appl. No.: 807,084

[22] Filed: Dec. 10, 1985

[30] Foreign Application Priority Data

Dec. 10, 1984 [FR] France .................. 84 18811

[51] Int. Cl.⁴ .................................... B21C 29/00
[52] U.S. Cl. ................................. 72/254; 83/170; 432/250
[58] Field of Search ............ 72/254, 270, 202, 203; 83/15, 170; 432/6, 250

[56] References Cited

U.S. PATENT DOCUMENTS

| | | | |
|---|---|---|---|
| 2,495,077 | 1/1950 | Protzeller | 83/170 |
| 2,881,297 | 4/1959 | Friedman . | |
| 3,462,890 | 8/1969 | Blumenkranz et al. | 83/170 |
| 4,343,209 | 8/1982 | Moelbert . | |
| 4,404,830 | 9/1983 | Koch . | |
| 4,559,854 | 12/1985 | Jurgens | 83/15 |

FOREIGN PATENT DOCUMENTS

| | | |
|---|---|---|
| 2340160 | 9/1977 | France . |
| 2358232 | 2/1978 | France . |
| 155959 | 12/1979 | Japan . |
| 749579 | 7/1980 | U.S.S.R. . |

Primary Examiner—Lowell A. Larson
Attorney, Agent, or Firm—Pollock, Vande Sande & Priddy

[57] ABSTRACT

Installation for preparing metal billets for extrusion, comprising a furnace (1) heating a metal bloom (4), having an elongate receptacle (10), means of heating the bloom and means (3) of pushing the bloom out of the receptacle along a longitudinal axis of movement, and a shear (2) cutting the bloom into billets of a length suitable for extrusion, comprising a pair of rear jaws (5) mounted in a fixed frame (21) and at least one front jaw (65) mounted so as to slide, transversely relative to the axis of movement of the bloom, along the rear jaws (5) and on the opposite site to the furnace (1) and associated with means (66) of controlling, as a result of sliding, the shearing of a specific length of the bloom (4). The rear jaws (51, 52) are placed directly against the outlet end (13) of the furnace (1) in the extension of the receptacle (10), so as to form with the latter a substantially continuous enclosure, while the front jaw (65), arranged in alignment with the receptacle (10) after transverse sliding, forms a door closing the furnace (1) between two shearing operations.

4 Claims, 7 Drawing Figures

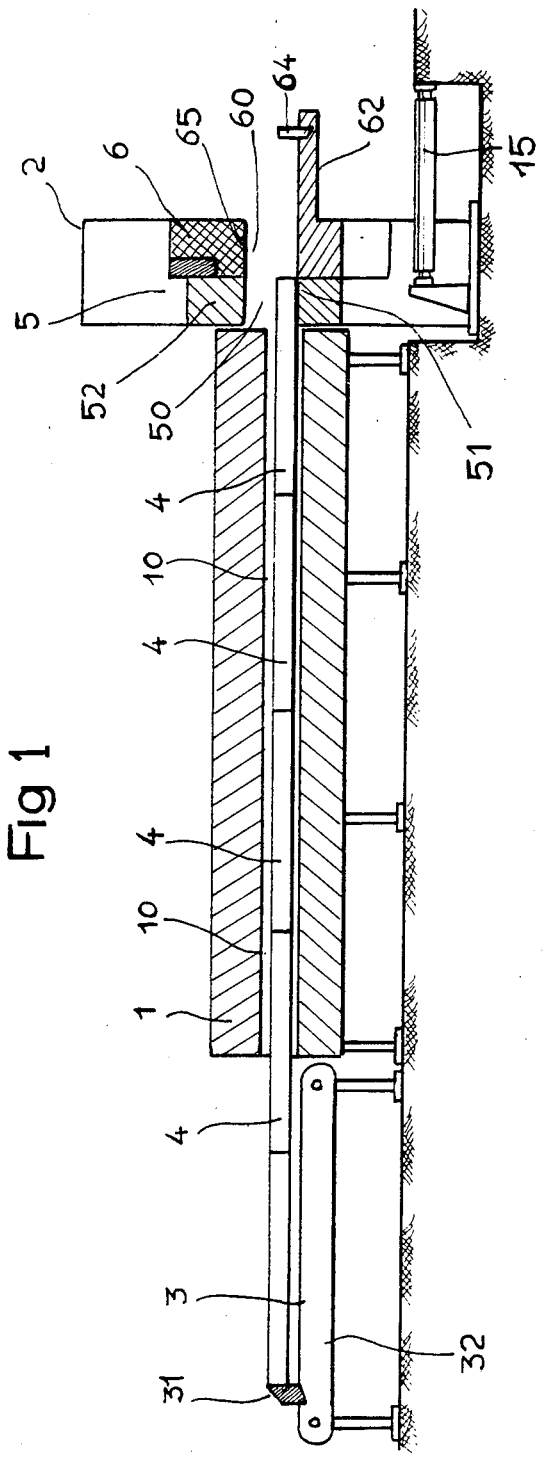

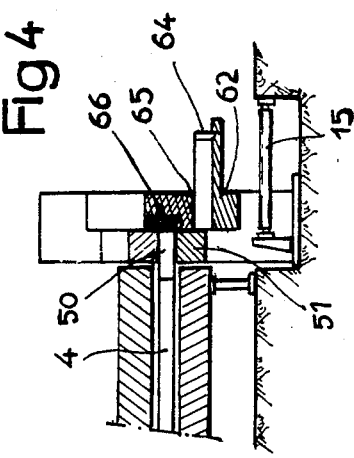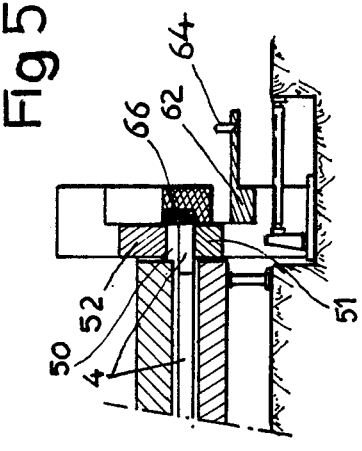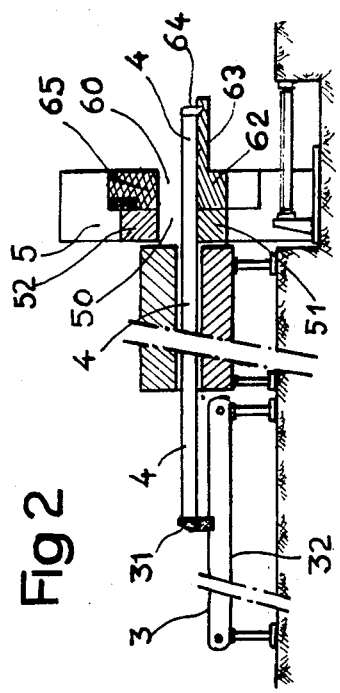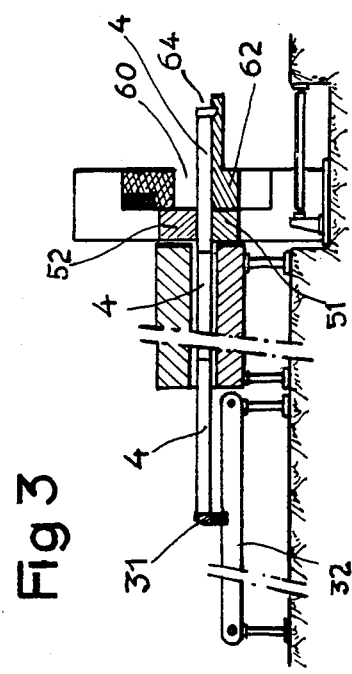

INSTALLATION FOR PREPARING METAL BILLETS FOR EXTRUSION

FIELD OF THE INVENTION

The subject of the invention is an installation for preparing billets of metal, such as copper, brass or aluminum, for conversion into sections by means of extrusion in an extrusion press.

DESCRIPTION OF THE PRIOR ART

Installations producing pressed or forged products consisting of non-ferrous metallic materials, e.g., copper, brass or aluminum sections, usually comprise a heating furnace through which passes a metal bloom, i.e. an elongated bar produced in a foundry, so as to be brought to the forming temperature there. The bloom heated in this way is cut in a hot shear into pieces or "billets" which are subsequently introduced into a forming installation, such as an extrusion press, and whose length, determined as a function of the performance of the press, is always relatively short. The installations for preparing billets therefore comprise, in general, a heating furnace having an enclosure which defines an elongate receptacle for the bloom and which is equipped with means of heating the latter to the desired temperature.

Usually, the receptacle is open at its two ends and the enclosure is associated with a means of pushing the bloom along the axis of the receptacle. The bloom, introduced inside the receptacle via an inlet orifice, is heated to the desired temperature and then pushed axially so that it emerges via an outlet orifice which is located at the other end and near which the shear is arranged. The latter consists of two pairs of connected jaws, each defining an orifice with a cross-section substantially equal to that of the bloom and centered on the axis of movement of the latter. During the time when the bloom is being pushed along, the orifices of the jaws are arranged in the extension of the receptacle, so that the bloom engages into them when it leaves the furnace.

The shear comprises a pair of rear jaws mounted in a fixed frame and a pair of front jaws mounted so as to slide, transversely relative to the axis of movement of the bloom, along the rear jaws on the side opposite to the furnace. During shearing carried out between the upper front jaw and the lower rear jaw, the bloom is blocked, at least at the rear of the cutting plane, between the lower rear jaw constituting a fixed support and the upper rear jaw associated with means of clamping as a result of movement transverse to the axis of the bloom.

Furthermore, the lower front jaw is usually provided with an extension, making it possible to support the part of the bloom which projects in front of the jaw and the length of which can be determined by a stop arranged on the said extension in an adjustable position.

Thus, during the cutting of a billet carried out as a result of the sliding of the front jaws, the bloom remains effectively retained between the two pairs of jaws, thereby making it possible to avoid deformations liable to transmit reactions to the heating furnace.

In some cases, the bloom is heated by an induction furnace which has an inductor defining a tubular receptacle through which the bloom passes. The latter must have a cross-section only a little less than that of the receptacle, so that heat losses are only slight, sealing being ensured by means of the bloom itself. However, as a result of this, it is necessary to adjust the diameter of the inductor to that of the bloom, and there is an increased risk of damage to the furnace because of deformation of the bloom at the moment of cutting. Moreover, it is necessary to use completely straight blooms, and when rough foundry bars are employed they have to be cut into billets in advance before being heated in the furnace.

Large-size furnaces heated, for example, by gas are also used for heating the blooms, and the advantage of these is that the complete bloom and even several blooms can be heated, so they are more economical.

In fact, in this case, the furnace has a receptacle of great length at least equal to that of a bloom and often sufficient to contain several blooms arranged behind one another. The burner is located near the outlet of the furnace, to bring the front part of the bloom to the desired temperature, and the smoke is drawn towards the inlet of the furnace, so as to preheat the rear part of the bloom or blooms standing by.

To avoid heat losses, it has until now seemed natural to set the shear slightly apart from the furnace and to close the outlet orifice of the receptacle by means of a removable door. Consequently, after the bloom has been pushed until it stops along the extension of the front supporting jaw, and after the billet has been sheared to the desired length, the bloom has to be pushed back by means of a jack located on the upper front jaw, to reintroduce into the furnace the part projecting from the latter during shearing, and the end of the furnace is then closed so that the front end of the bloom is maintained at the desired temperature during the discharge of the cut billet.

However, attempts have been made for some time, in modern extrusion installations, to achieve higher and higher production rates by reducing the idle times and increasing the extrusion speeds. Hitherto, the efforts of designers have been directed essentially at the extrusion press and the equipment located downstream of the latter. It is now possible to obtain such high extrusion rates that, at the present time, the installation preparing the billets may itself become a disturbing element which risks slowing down the rate.

The invention is designed to overcome these disadvantages.

SUMMARY OF THE INVENTION

According to the invention, the rear jaws are placed directly against the outlet end of the furnace in the extension of the receptacle, so as to form together with the latter a practically continuous enclosure, and the front jaw is maintained in alignment with the receptacle after transverse sliding, to form a door closing the furnace between two shearing operations.

Preferably, the rear face part of the front jaw, arranged in alignment with the receptacle after sliding, is equipped with a plate made of refractory material to shut off the orifice limited by the rear jaws.

To minimize the heat losses, the fixed frame in which the rear jaws are mounted is connected to the outlet end of the furnace by a coupling menas capable of resisting heat.

In a particularly advantageous embodiment, at least the rear jaws are provided with means of heating the part of the bloom which they grip between two shearing operations.

BRIEF DESCRIPTION OF THE DRAWINGS

The invention will be better understood from the detailed description of a particular embodiment given as an example and illustrated in the accompanying drawings, in which:

FIG. 1 shows diagrammatically an entire installation for preparing billets according to the invention;

FIGS. 2 to 5 are diagrams representing the successive shearing steps;

DETAILED DESCRIPTION

Figure 6:
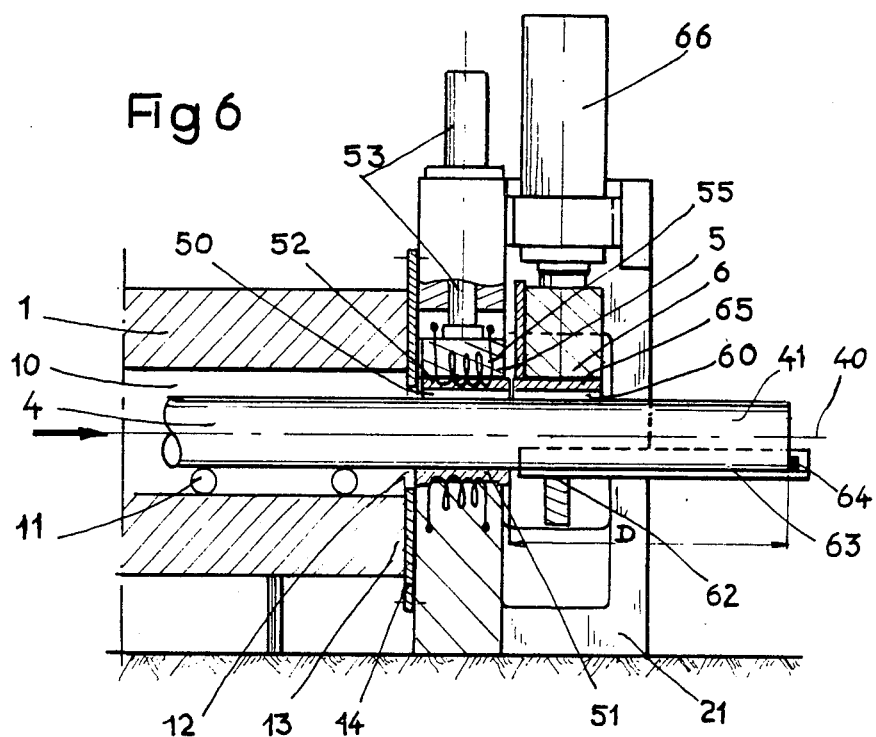
FIGS. 6 and 7 show the shear on an enlarged scale in its engagement position, and its shearing position respectively.

The installation illustrated diagrammatically in FIG. 1 comprises a heating furnace 1, a shear 2 and a means 3 of pushing the blooms 4 in sequence inside the furnace. The said furnace consists of an enclosure limiting an elongate receptacle 10 having a cross-section greater than that of the blooms and a length at least equal to that of a bloom, but which, if the overall size allows, can also be sufficient for the furnace to contain several blooms, thus making it possible to achieve a better recovery of heat. The blooms move along the longitudinal axis of the receptacle 10 under the action of pushing means 3 which can consist of a stop 31 mounted on an endless belt 32 actuated by a means (not shown), so as to advance the blooms 4 the desired distance one after the other. The enclosure of the furnace 1 is provided with conventional heating means (not shown), such as gas burners, which are normally arranged on the same side of the outlet and which make it possible to increase the temperature of the blooms 4 to the desired level, allowing for the average time spent inside the furnace.

Figure 7:
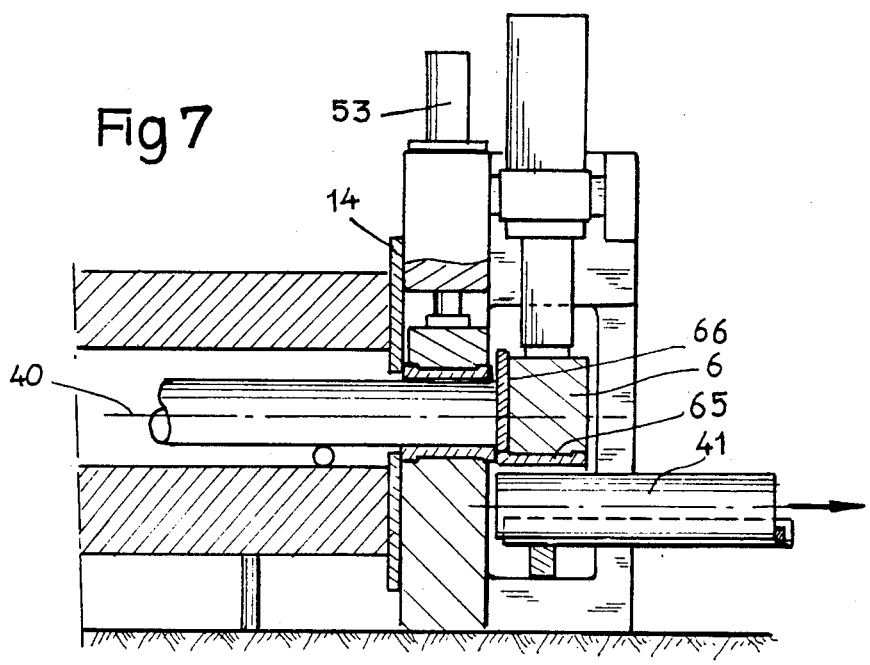

The shear 2 shown in more detail in FIGS. 6 and 7 comprises, within a fixed frame 21, a pair of rear jaws 5 and a pair of front jaws 6.

The rear jaws 5 comprise a lower supporting jaw 51 fastened to the frame 21 and an upper jaw 52 mounted so as to be movable over a short distance transversely relative to the axis 40 of the bloom 4 and actuated by a jack 53 clamping the bloom 4 between the jaws 51 and 52, the latter defining an orifice 50 of a cross-section slightly greater than that of the bloom.

The front jaws 6 are mounted in this same frame 21 so as to slide perpendicularly relative to the axis 40 of the bloom 4. They comprise an upper jaw 65 and a lower jaw 62 which, during shearing, supports practically no force at all and can consist of a simple channel extended forwards by means of an overhanging part 63 of a sufficient length to support the part of the billet projecting out of the jaw 6. In a known way, the extension 63 of the channel 62 is provided with an adjustable stop 64, and the distance D between the latter and the front face of the rear jaws 5 makes it possible to define the length given to the billet 41.

Shearing is carried out by the upper jaw 65, the cross-section of which corresponds substantially to that of the upper wall of the bloom 4 and which moves in a direction perpendicular to the axis 40 of the bloom under the action of a cutting jack 66 supported on the frame 21.

FIG. 6 shows the shear in the open position. The jaws are raised and define a passage orifice for the bloom, arranged in the extension of the receptacle 10 of the furnace and centered on the longitudinal axis 40. The lower front jaw 51 and the channel 62 are set at the height of the lower part of the bloom 4 which moves in the receptacle 10 on bearing means, for example a rolling track 11.

According to an essential feature of the invention, the door closing the outlet orifice 12 of the furnace is omitted and the frame 21 of the shear is placed directly against the end 13 of the enclosure of the furnace 1, so that the two jaws 5 and 6 are arranged in the extension of the receptacle 10. For this purpose, the frame 21 can be connected to the enclosure of the furnace 1 by a fixed or flexible coupling means which is capable of resisting heat and which can consist of a plate 14 made of refractory steel, which is integral with the end 13 of the furnace and which can be screwed directly on to the frame 21 of the shear. Thermal continuity between the receptacle 10 of the furnace and the receptacle 50 formed by the shear is thus guaranteed, and moreover the rear jaw 5 can be provided with heating means consisting, for example, of conductive windings 55, as shown diagrammatically in FIG. 6.

The arrangements which have just been described make it possible to improve the operating cycle of the installation substantially. In fact, after the shearing of a billet, the front jaws 6 remain in the position shown in FIG. 7, while the billet 41 is discharged in a conventional manner, for example by means of a carriage 15, into which the billet can be dumped, for example by means of an arm carrying the channel 62 and mounted pivotably about a horizontal axis. The carriage 15 rolling on rails subsequently conveys the billet to a device loading it into the press (not shown).

In prior art installations, after the discharge of the cut billet, the front jaw 6 has been raised into rest position and the furnace closed. By contrast in the arrangement according to the invention, the front jaw 65 remains in the shearing position, so that its part 68 which in this position, is in alignment with the bloom, forms a door closing the receptacle 10 of the furnace, this door being extended by the receptacle 50 of the rear jaw 5. For this purpose the corresponding rear part 68 of the jaw 6 can consist of a plate made of refractory material, which forms a member shutting off the furnace. In this position of rest, the upper rear jaw 52 can be raised by means of the jack 53, so as to release the end of the bloom which has passed into the jaw 5.

From this position, the shearing cycle takes place in the following way, its successive phases being shown diagrammatically in FIGS. 1 to 5.

1. In response to the instruction "call up a new billet", the front jaws 6 are raised. The orifice 60 defined by the channel 62 and by the upper jaw 65 thus comes into alignment with the orifice 50 and the receptacle 10 as an extension of these, in the position shown in FIG. 1.

2. With the furnace being opened in this way, the bloom 4 is advanced the desired length by means of a stop 31, i.e., up to the stop 64, in the position shown in FIG. 2.

3. The jack 53 then controls the clamping of the end of the bloom 4 as a result of the transverse movement of the upper rear jaw 52 (FIG. 3).

4. The jack 66 subsequently controls the movement of the front jaws 6 and the shearing of the billet by the upper jaw 65 (FIG. 4). The refractory part 68 of the front jaw, which slides along the front face 51 of the rear jaw 5, passes across the axis 40 of the bloom (FIG. 4).

5. The upper rear jaw 52 can then be raised by means of the jack 53 to release the end of the bloom 4; the receptacle 50 limited by the jaws 5 and forming an extension of the receptacle 10 of the furnace is shut off by the refractory plate 68 to prevent heat losses. The starting position of the cycle is thus resumed.

It will be seen that the shearing cycle is simplified, since the operation of reintroducing the bloom inside the furnace 1 is eliminated. This reduces the time of the shearing cycle and, if the production rate of the press justifies this, the phase of closing the furnace can be omitted by returning directly, after shearing, to the advancing position of the bloom for shearing a new billet. In addition, the thermal efficiency of the furnace is improved substantially, since the furnace remains open only during the phase of advance of the bloom and of shearing.

Moreover, the equipment is simplified because there is no need for the furnace-closing door, the reintroduction jack and the connection required between the furnace and the shear when the latter was set apart from the furnace to allow the passage of the door. This simplification of the equipment increases its reliability and reduces maintenance problems.

Finally, because the phase of reintroducing the blooms after shearing is omitted, the movements of the bloom are reduced, thus lengthening the service life of the sliding tracks 11 of the furnace.

What is claimed is:

1. An installation for preparing metal billets to be extruded, comprising a furnace heating a metal bloom and a shear cutting the bloom into billets of a length suitable for extrusion,
    (a) said furnace comprising a heating enclosure defining an elongate receptacle of a length at least equal to that of said bloom and means for pushing said bloom out of said receptacle along a longitudinal axis of movement, passing through an outlet orifice located at one end of the latter;
    (b) said shear comprising connected jaws, each defining an orifice of a cross-section substantially equal to that of said bloom and centered on the axis of movement of the latter;
    (c) said jaws including a pair of rear jaws mounted in a fixed frame adjacent to said furnace and at least one front jaw mounted for transverse sliding movement relative to the axis of movement of said bloom along said rear jaws on the opposite side to said furnace and associated with means for controlling the shearing of a specific length of said bloom as a result of sliding;
    (d) said rear jaws being placed directly against an outlet end of said furnace in an extension of said receptacle, so as to form together with said receptacle a substantially continuous enclosure;
    (e) said front jaw bing maintained in alignment with said receptacle after transverse sliding, said front jaw forming in this position a door closing said furnace between two shearing operations;
    (f) a rear face part of said front jaw arranged in alignment with said receptacle after sliding being provided with a plate made of refractory material for shutting off said orifice limited by said rear jaws.

2. An installation for preparing billets as claimed in claim 1, comprising heat-resistant coupling means connecting said fixed frame in which said rear jaws are mounted to said outlet end of said furnace.

3. An installation for preparing metal billets to be extruded, comprising a furnace heating a metal bloom and a shear cutting the bloom into billets of a length suitable for extrusion,
    (a) said furnace comprising a heating enclosure defining an elongate receptacle of a length at least equal to that of said bloom and means for pushing said bloom out of said receptacle along a longitudinal axis of movement, passing through an outlet orifice located at one end of the latter;
    (b) said shear comprising connected jaws, each defining an orifice of a cross-section substantially equal to that of said bloom and centered on the axis of movement of the latter;
    (c) said jaws including a pair of rear jaws mounted in a fixed frame adjacent to said furnace and at least one front jaw mounted for transverse sliding movement relative to the axis of movement of said bloom along said rear jaws on the opposite side to said furnace and associated with means for controlling the shearing of a specific length of said bloom as a result of sliding;
    (d) said rear jaws being placed directly against an outlet end of said furnace in an extension of said receptacle, so as to form together with said receptacle a substantially continuous enclosure;
    (e) said front jaws being maintained in alignment with said receptacle after transverse sliding, said front jaw forming in this position a door closing said furnace between two shearing operations;
    (f) at least said rear jaws being provided with means for heating the part of said bloom which they grip, between two shearing operations.

4. An installation for preparing billets as claimed in claim 3, comprising heat-resistant coupling means connecting said fixed frame in which said rear jaws are mounted to said outlet end of said furnace.

* * * * *